US011443065B2

(12) United States Patent
Regensburger et al.

(10) Patent No.: US 11,443,065 B2
(45) Date of Patent: Sep. 13, 2022

(54) SYSTEMS AND METHODS FOR OBSCURING DATA FROM A DATA SOURCE

(71) Applicant: IMMUTA, INC., College Park, MD (US)

(72) Inventors: Joseph J. Regensburger, Grove City, OH (US); Andrew D. Burt, Washington, DC (US); Barry R. Hammen, Severn, MD (US); Alfred V. Rossi, III, Hilliard, OH (US)

(73) Assignee: IMMUTA, INC., College Park, MD (US)

( * ) Notice: Subject to any disclaimer, the term of this patent is extended or adjusted under 35 U.S.C. 154(b) by 265 days.

(21) Appl. No.: 16/843,487

(22) Filed: Apr. 8, 2020

(65) Prior Publication Data

US 2020/0320224 A1 Oct. 8, 2020

Related U.S. Application Data

(60) Provisional application No. 62/831,129, filed on Apr. 8, 2019.

(51) Int. Cl.
*G06F 21/62* (2013.01)
*G06F 17/18* (2006.01)

(52) U.S. Cl.
CPC .......... *G06F 21/6254* (2013.01); *G06F 17/18* (2013.01)

(58) Field of Classification Search
CPC .................................................. G06F 21/6254
See application file for complete search history.

(56) References Cited

U.S. PATENT DOCUMENTS

| 8,965,066 | B1* | 2/2015 | Derakhshani | G06V 40/197 382/209 |
| 10,313,127 | B1* | 6/2019 | Flach | G06F 21/554 |
| 2008/0052527 | A1* | 2/2008 | Siedlarz | G06F 21/32 713/186 |
| 2009/0228952 | A1* | 9/2009 | Gillig | G06F 21/6218 726/1 |
| 2013/0047268 | A1* | 2/2013 | Arat | G06F 21/6218 726/28 |
| 2013/0318361 | A1* | 11/2013 | Erickson | G06F 21/6245 713/193 |
| 2015/0302210 | A1* | 10/2015 | Cismas | G06F 21/64 726/28 |
| 2018/0109520 | A1* | 4/2018 | Han | G06F 21/62 |
| 2019/0121350 | A1* | 4/2019 | Cella | G06N 5/046 |
| 2020/0320224 | A1* | 10/2020 | Regensburger | G06F 17/18 |

* cited by examiner

*Primary Examiner* — Ponnoreay Pich
(74) *Attorney, Agent, or Firm* — MH2 Technology Law Group, LLP

(57) ABSTRACT

Systems and methods for obscuring data from a data source include devices and processes that may objectively measure the information loss for a dataset that is caused by applying a privacy policy, and may select and apply a policy to the dataset based on the measured information loss. The systems and methods may measure the information loss for a large dataset by taking a representative sample from the dataset and applying the policy to the sample in order to quantify the information loss. The quantified information loss can be iteratively used to change the policy in order to meet utility and/or privacy goals, and the system can subsequently apply the changed policy to the dataset.

3 Claims, 15 Drawing Sheets

```
{
    "IQR": 0.5,
    "Q05": 0,
    "Q25": 0,
    "Q74": 0.5,
    "Q95": 1,
    "Mean": 0.3349380362,
    "Median": 0,
    "Bin Size": 1,
    "Kurtosis": 27.8943297736,
    "Skewness": 3.1367867947,
    "Variance": 0.1905753847,
    "Bin Counts": {
        3,
        5331,
        3517,
        1605,
        34
    },
    "Blurred Max": 4.7678380158,
    "Blurred Min": -1.1296207921,
    "Sample Size": 10490,
    "Percent NULL": 0,
    "Bin Lower Limit": {
        -1,
        -0.0178451539,
        0.4846526743,
        0.9871505025,
        4.4817944897
    },
    "Histogram Bin Size": 0.0228408104,
    "Mean Absolute Deviation": 0.3411934195
}
```

FIG. 5

| Rank | Label | Value | Column |
|---|---|---|---|
| NaN | Unobserved | 0.000000 | store_and_fwd_flag |
| NaN | Extrapolated Cardinality | 2.000000 | store_and_fwd_flag |
| NaN | Cardinality of Samples | 2.000000 | store_and_fwd_flag |
| NaN | Percent Distant | 0.000002 | store_and_fwd_flag |
| NaN | Percent NULL | 0.000000 | store_and_fwd_flag |
| NaN | Sample Size | 10490.000000 | store_and_fwd_flag |
| NaN | Sample Fraction | 1.000000 | store_and_fwd_flag |
| 1.0 | N | 0.993232 | store_and_fwd_flag |
| 2.0 | Y | 0.006768 | store_and_fwd_flag |

```
{
  "website":{"tag":["URL"]},
  "purchase_amount":{"tag":[]},
  "gender":{"tag":["GENDER"]},
  "passport":{"tag":["FRANCE_PASSPORT"]},
  "date_time_of_purchase": {"tag": ["DATE", "TIME"]},
  "purchase_number": {"tag": []},
}
```

FIG. 7

```
{"gender":
    {
    "Percent NULL":0.0,
    "Average String Length":6.0,
    "Maximum String Length":6,
    "Minimum String Length":6,
    "Average White Space":0.0,
    "Average Upper Case Characters":3.0,
    "Average Lower Case Characters":3.0,
    "Leading Regular Expressions":["^(([A-Z]+))(([a-z]+))(([A-Z]+))(([a-z]+))$","^(([A-Z]+))$"],
    "Leading Regular Expression Frequencies":[18,6]
    },
"passport":
    {
    "Percent NULL":0.0,
    "Average String Length":9.0,
    "Maximum String Length":9,
    "Minimum String Length":9,
    "Average White Space":0.0,
    "Average Upper Case Characters":2.0,
    "Average Lower Case Characters":0.0,
    "Leading Regular Expressions":["^(([\\\d]+))(([A-Z]+))(([\\\d]+))$"],
    "Leading Regular Expression Frequencies":[24]
```

FIG. 8A

```
},
"col_98":
{
"Percent NULL":0.0,
"Average String Length":9.4583333333,
"Maximum String Length":28,
"Minimum String Length":2,
"Average White Space":0.625,
"Average Upper Case Characters":1.9583333333,
"Average Lower Case Characters":6.5416666667,
"Leading Regular Expressions":[
"^(([A-Z]+))$",
"^(([A-Z]+))(([a-z]+))$",
"^(([A-Z]+))(([a-z]+))(([\\\s])+)(([A-Z]+))(([a-z]+))$",
"^(([\\\d]+))(([a-z]+))$",
"^(([A-Z]+))(([a-z]+))(([^A-Za-z\\\d\\\s]+))(([\\\s])+)(([A-Z]+))(([a-z]+))((
(([A-Z]+))(([a-z]+))$",
"^(([A-Z]+))(([A-Z]+))(([\\\s])+)(([A-Z]+))(([a-z]+))$",
[\\\s])+)(([A-Z]+))(([a-z]+))$"
],
"Leading Regular Expression Frequencies":[9,8,3,2,2]
}
}
```

FIG. 8B

| Severity of Differences ↓ | Column | Data Source |
|---|---|---|
| 1 | Supplier State | pg public Staples |
| 1 | Supplier Name | pg public Staples |
| 1 | Product Name | pg public Staples |
| 1 | Product ID | pg public Staples |
| 1 | Order ID | pg public Staples |
| 1 | Manager Name | pg public Staples |
| 1 | Employee Name | pg public Staples |
| 1 | Employee Dept | pg public Staples |
| 1 | Customer State | pg public Staples |
| 1 | Customer Name | pg public Staples |
| 1 | Call Center Region | pg public Staples |
| 1 | Product Base Margin | pg public Staples |
| 0.999 | Employee Yrs Exp | pg public Staples |
| 0.959 | Order Day | pg public Staples |
| 0.928 | Market Segment | pg public Staples |

SYSTEMS AND METHODS FOR OBSCURING DATA FROM A DATA SOURCE

CROSS-REFERENCE TO RELATED APPLICATIONS

This application claims the benefit and filing date of U.S. Provisional Application No. 62/831,129 filed on 8 Apr. 2019, which is hereby incorporated by reference in its entirety.

BACKGROUND

The ubiquity of data has made it possible to develop empirical mathematical models and beneficial analytics to, for example, predict a large number of event types. Events types such as shopping behavior, entertainment preferences, medical conditions, driving actions, financial risk, etc. can now be accurately predicted and/or beneficially analyzed using the expansive amount of data people generate and organizations record every day.

This, however, comes at a price to personal privacy, as data that identifies an individual or that describes something about an individual that should be kept private, (which may be referred to as personal data or sensitive data), is contained in the datasets collected by organizations, and may be disseminated to other organizations or individuals.

In response to data privacy concerns, personal or sensitive data can be simply removed or redacted or held back from the data stores or data sources of organizations. But depending on the data, this may render the dataset less suitable, or even unusable, for various purposes that are valuable to the organization and/or to society. In other words, removing or redacting data significantly reduces its analytic value and can reduce the analytic value of the entire dataset.

Thus, it is desirable to provide systems and methods that enable an organization to balance safeguards to personal privacy with the need to provide access to the data in its data stores in a manner that reduces the reduction in analytic value, keeping the data suitable and usable for various purposes.

BRIEF SUMMARY

Embodiments consistent with the present invention include systems and processes that measure information loss on a dataset when the dataset is protected by a privacy policy. The described embodiments include systems and processes that efficiently sample a large dataset, apply policies to the sample, and objectively quantify the data-loss or utility impact of those policies, which quantification may be used to select and apply specific policies to the dataset.

Various embodiments include a system that can include a computer-readable data storage device containing program instructions and an associated processor that executes the instruction to perform a process or set of operations. The operations can include sampling a data source to obtain a sample of data that is statistically representative; determining ridge statistics for the sample of data; measuring or otherwise determining a first entropy, or an information baseline, of the sample of data; applying the data privacy policy to the sample of data; measuring or otherwise determining a second entropy, or an information content, of the sample of data with the policy applied; calculating an information loss value based on the difference between the first entropy and the second entropy; and displaying the information loss value. In some variants, the operations can also include applying the data privacy policy to the data source if the information loss value is within predetermined limits.

Other embodiments can include a process or operations for sampling a data source to obtain a sample of data that is statistically representative; determining ridge statistics for the sample of data; receiving a data privacy policy for a dataset of the data source; determining an estimate of information loss caused by the data privacy policy using the ridge statistics; displaying the estimate of the information loss; and, optionally, applying the data privacy policy to the data source if the estimate of the information loss is within predetermined limits.

BRIEF DESCRIPTION OF THE DRAWINGS

FIG. 5 shows an example of descriptive statistics and other data for a basic numeric ridge, in accordance with aspects of the present disclosure.

FIG. 6 is a representation of an example of descriptive statistics and other data for a cardinality ridge, in accordance with aspects of the present disclosure.

FIG. 7 shows an example of descriptive statistics and other data for a sensitivity ridge, in accordance with aspects of the present disclosure.

FIG. 8A shows the first part of an example of descriptive statistics and other data for a string ridge, in accordance with aspects of the present disclosure.

FIG. 8B shows the second part of an example of descriptive statistics and other data for a string ridge, in accordance with aspects of the present disclosure.

FIG. 10C shows a screen shot of another example of quantified information-loss information, in accordance with aspects of the present disclosure.

DETAILED DESCRIPTION

Figure 1:
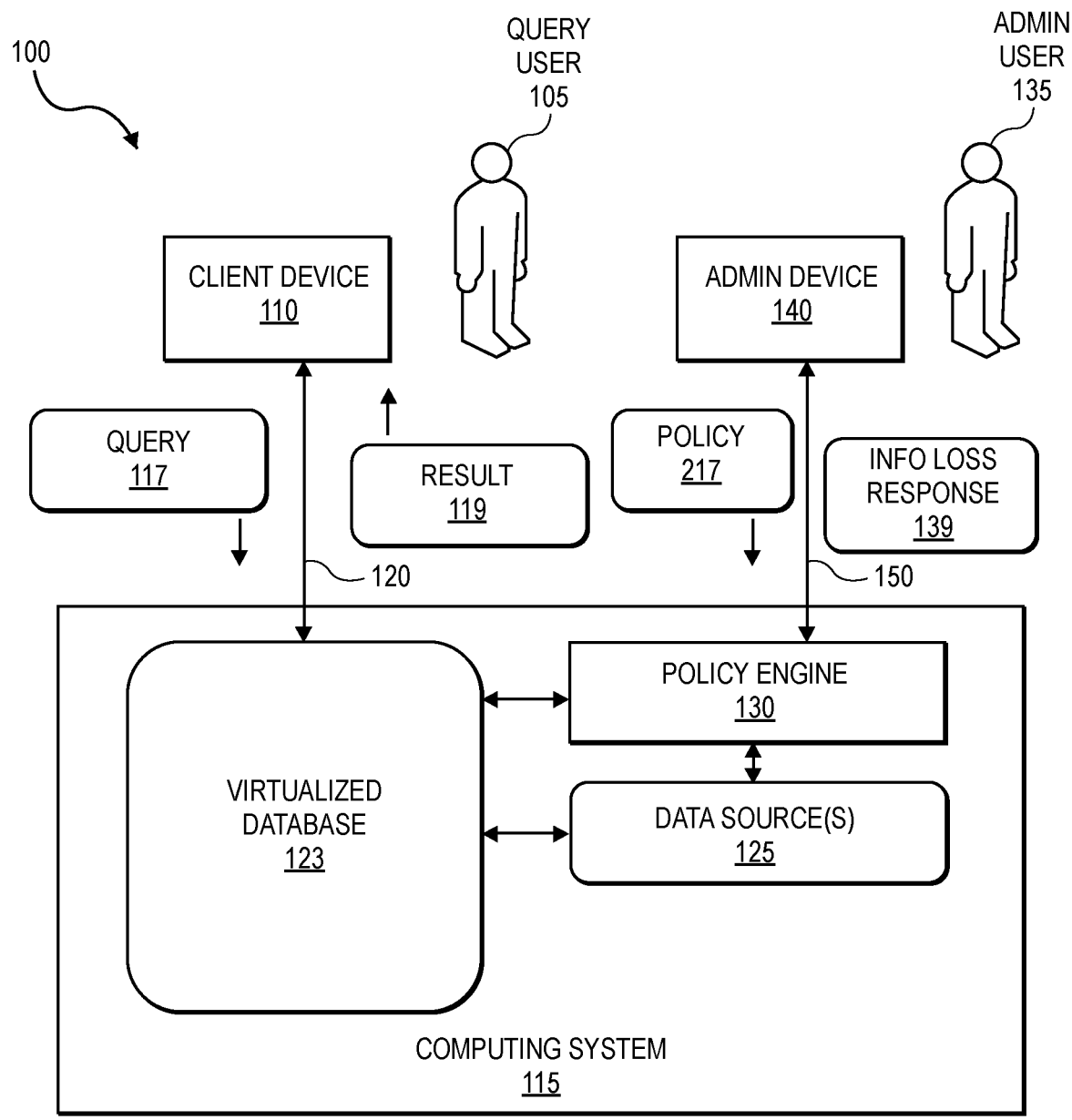
FIG. 1 illustrates a block diagram of an example of an environment 100 for implementing systems and methods in accordance with aspects of the present disclosure.

One way to protect privacy in a dataset or data store is to apply one more privacy policy. A privacy policy is a set of rules, techniques, and/or operations which perturb, redact, or otherwise obscure data within or from a dataset, often focused on sensitive data or personal data. Privacy policies can produce the effect of reducing the precision of data (e.g. representing date-of-birth as year-of-birth or generalizing zip code to state), removing sensitive data elements (e.g. removing social security numbers), or randomizing certain data elements, such as measurements, among other things. In various implementations described herein, a privacy policy may have numerous associated parameters, such as parameters that: specify the user(s) that can access the data from a data store, specify what portions of data can be accessed by a specified user, specify the purpose(s) for which the data can be used, and specify the amount of precision with which to show the data, among other things. Each policy, depending on its content, type, and parameter set, provides a variable amount of privacy at the tradeoff cost of loss of some analytic value, which may also be referred to as utility.

The privacy-utility tradeoff is a central concern for the multitude of useful and beneficial analytics applications which operate with sensitive data. Favoring the privacy extreme, a dataset provided to an analytics application can simply be represented as randomized entries. This assures that no private information is leaked, but would have no utility for gaining insights. On the other extreme, all collected data can be utilized as is without privacy protections. The data would have maximal utility but present a significant risk of being misused, either maliciously or accidentally.

How to efficiently and objectively applying one or more a privacy policy to obscure sensitive data while balancing the privacy-utility tradeoff is a technical problem that is central to establishing and sustaining a useful and beneficial analytics practice. But current conventional systems for choosing and applying privacy policies do not address this problem. Current conventional systems simply apply whatever privacy policy is selected by a user without regard to the utility cost of the policy and without regard to the amount of information loss caused by the policy. In those conventional systems, policies are applied subjectively, at the whim of the current administrator or user.

Unlike convention systems where a privacy policy is subjectively chosen using human intuition and/or a user's prior experience with other databases, various embodiments of the systems and methods described herein instead perform an unconventional, unique combination of steps for measuring and/or calculating an information-loss factor or estimate that is unique for a specific privacy policy as it applies to a specific dataset (e.g., database or portion thereof). The same policy will often have different impacts on information loss for different datasets, and various embodiments described herein quantify the impact for each different dataset, which enables objective decisions regarding whether or not to apply a policy to a given dataset. Similarly, different policies will typically cause different amounts of information loss (e.g., utility) for a single dataset, and various embodiments described herein quantify those different amounts of information loss to enable objective decisions regarding selecting a policy to apply to the dataset. By evaluating and quantifying the information loss associated with a specific privacy policy and a specific dataset, and applying a policy to obscure data based on the quantified information loss, various embodiments described herein remove what were previously subjective human decisions made based on criteria other than information loss (e.g., based on intuition or past experiences with different datasets) and replaces them with rules-based, objective, computerized operations and decisions.

Measuring the information-loss impact of a privacy policy on data is non-trivial and doing it efficiently is a difficult technical and practical problem. A system could, for example, measure the information-theoretic content of a data source both before and after a policy is applied to the data source, using a metric such as Shannon's Entropy to calculate the amount of information before and after. This approach is not practical or efficient in many real-life systems, however, because it requires repeatedly querying or accessing the data source to obtain before and after Shannon's Entropy measurements each time a policy and/or the policy parameters are changed. This is very slow and time consuming and it uses large amounts of computing resources. Under this approach, the performance become untenable and impractical when data volumes become large, and/or when policies are being altered frequently. And, altering policies often occurs frequently during the initial phases of an analytic project.

Various embodiments of the systems and methods described herein quickly and efficiently measure the impact of a privacy policy on a dataset, including a large dataset, in part by accessing the dataset once or infrequently to build a model, or fingerprint, of the dataset, and thereafter the model is used to calculate the information loss or privacy impact or utility change caused by different policies. The fingerprint represents the dataset, and is used instead of the dataset to evaluate the information loss, etc. associated with a new policy. Various embodiments of the systems and methods described herein provide a practical solution for measuring how privacy policies impact utility and for applying one or more policy based on that impact, providing a novel and efficient solution for testing and balancing the privacy-utility tradeoff.

More particularly, various embodiments described herein provide practical systems and methods for obscuring data from a data source based on the amount of information loss caused by an obscuration policy. Various embodiments may include devices and operations for specifying a policy, measuring or calculating the information loss caused by the policy on a given dataset, associating the specified policy with the dataset, and then applying the specified policy to the data source such that only obscured data is available to users. Thus, in one aspect, the embodiments described herein improve the functioning of databases by enabling the objective and automated application of a privacy policy to the databases, especially large databases. This may be achieved by partially or completely obscuring a specific portion(s) (e.g., column) of a dataset according to a privacy policy(ies) that is selected or used according to the amount of information loss the policy causes for that dataset, where the system objectively calculates the amount of information loss.

In another aspect, the embodiments described herein improve the functioning of conventional data obscuring technology on the data in a dataset (e.g., a database) by providing an automatically and objectively calculated information-loss estimate for use in comparing privacy policies to each other, e.g., according to the amount of information loss for each policy.

FIG. 1 illustrates a block diagram of an example of a system or an environment 100 for implementing systems and methods in accordance with aspects of the present disclosure. The environment 100 may include a query user 105, a client device 110, an admin user 135, an admin device 140, and a computing system 115, which includes a policy engine 130, a virtualized database 123, and one or more data source(s) 125, which may be referred to in the singular herein for ease of explanation although it may comprise two or more data sources.

In one usage example, the query user 105 may use the client device 110 to send a query 117 (e.g., a request for data from a data store) to the computing system 115, which provides a result 119, after applying a privacy policy to the requested data (e.g., which may be done by the policy engine 130). The privacy policy typically impacts the result 119 of any query issued by the user 105, for example, by obscuring some or all of the data in the result 119.

In a similar usage example, the admin user 135 may use the admin device 140 to send a policy 217 and associated metadata (e.g., a privacy policy and its parameters 219 and/or commands for application to the data source 125) to the computing system 115, which provides a response 139, (which may include an information loss report), after calculating the effect of the policy 217 on the particular data of the data source 125. In various implementations, the response 139 objectively quantifies the information-loss impact caused by the policy 217 with respect to the data from the data source 125, allowing the admin user 135 and/or admin device 140 to compare and select from among multiple possible policies 217 based on their information-loss effects.

In various implementations, the policy 217 may specify to the system 100 which obscuring technique or algorithm to apply to a specific portion of the data (e.g., a column) from the data source 125, among other things. In various embodiments, the admin user 135 may create, select, and/or customize the policy 217 to specify the obscuring technique for the system to use, among other criteria. Two examples of obscuring techniques include obfuscation by hashing a column of data (e.g., hashing state name data and putting the hash value into the column when accessed by the client device 110) and suppression by replacing a column of data with null values (e.g., removing the state name data and leaving the column blank when accessed by the client device 110). Various obscuring techniques and algorithms are discussed in detail below, including with respect to FIG. 9.

In various embodiments, the client device 110 can be an input/output device or computing device that is communicatively connected (directly or indirectly) to the computing system 115 via one or more communication channels 120. In some implementations, the client device 110 can be a terminal of the computing system 115 or a personal computing device or the like that provides a user interface. For example, the client device 110 may provide the query user 105 with a graphic user interface via which the query user 105 can send the query 117 to the computing system 115, and receive results 119. The communication channel 120 can comprise a wired or wireless data link and/or communication networks, such as a data bus, a local area network, a wide area network, or the Internet.

As noted previously as a usage example, the query user 105 may use the client device 110 to send a query 117 (e.g., a request for data from a data store) to the computing system 115. In various embodiments, the policy engine 130 can process the query 117 to determine whether any of the policies 217 (see FIG. 2) and their associated parameters 219 are applicable to the particular query user 105, data source 125, and/or virtualized database 123 specified by the query 117, and if so, the policy engine 130 can apply the appropriate privacy policy 217 to the responsive data before providing the result 119 to the client device 110. Thus, the query user 105 can only access or see the requested data after the data has been obscured according to the privacy policy 217, which may be applicable to some of the users of the client device 110, but not to others, which can be specified, for example, in the parameters 219 associated with a policy 217.

In various embodiments, the admin device 140 can be an input/output device or computing device that is communicatively connected (directly or indirectly) to the computing system 115 via one or more communication channels 150. In some implementations, the admin device 140 can be a terminal of the computing system 115 or a personal computing device or the like that provides a user interface. For example, the admin device 140 may provide the admin user 135 with a graphic user interface via which the admin user 135 can send a policy 217 to the computing system 115, and receive a response 139. The communication channel 150 can comprise a wired or wireless data link and/or communication networks, such as a data bus, a local area network, a wide area network, or the Internet.

In various embodiments, the computing system 115 includes hardware and software that perform the processes, services, operations, and functions described herein. In some embodiments, the computing system 115 can be implemented as a server. As shown in the example of FIG. 1, the computing system 115 can include or implement a virtualized database 123, which interacts with and accesses information from the data source(s) 125, and a policy engine 130, which interacts with the virtualized database 123, and also interacts with and accesses information from the data source(s) 125. In the embodiment shown, the virtualized database 123 also interacts with the client device 110 of the query user 105, and policy engine 130 also interacts with the admin device 140 of the admin user 135.

In various embodiments, the data source(s) 125 can be any type of information repository that is queryable. In some implementations, the data source 125 can be one or more queryable database, which may be columnated or columnar. In some implementations, the data source 125 can be or include data structures, such as PYTHON'S PANDAS DATAFRAME™ or R DATAFRAMES™, and/or can be or include data structures for common consumer applications, such as MICROSOFT EXCEL™ worksheets or MICROSOFT ACCESS™ databases, as are known to those of skill in the art.

In various implementations, the data source 125 can contain Personally Identifiable Information (PII) or other sensitive data. In one use case example, the data source 125 can be a collection of information (e.g., a dataset) maintained by a healthcare provider, and can contain medical, personal, and other sensitive information regarding patients, caregivers and insurers. In other use cases, the data source 125 can contain human resources data, business data, financial data (e.g., trade or transactional data), insurance data, etc.

In various typical implementations, the data source 125 is comprised of a collection of records (e.g., rows), and each record is comprised of a series of attributes (e.g., columns), as is commonly known in the art.

While the data source 125 is illustrated as being part of the computing system 115 in the example shown in FIG. 1, it is understood that some or all of the data source 125 could be located or stored remotely from the computing system 115 and/or maintained by one or more entities different from the entity that provides, operates, or maintains the computing system 115.

In various embodiments, the virtualized database 123 can be a database management system or service that acts as a container to transparently view and query other data sources (such as multiple databases or data sources 125) through a uniform interface that presents information from multiple sources as if they were a single source. For example, multiple databases (e.g. multiple data sources 125) can look like a single database to the query user 105. The virtualized database 123 can be system, service, and/or data structure that allows the query user 105 to transparently view and query multiple data sources 125 as if they were a one set of data. By doing so, the query user 105 can access information of the data source(s) 125 as a single database, without copying, duplicating, or combining the information of the data source(s) 125. The virtualized database 123 can be implemented as a queryable database system or service, such as POSTGRESQL, AMAZON REDSHIFT™, APACHE HIVE™, or SQL SERVER™, as are known to those of skill in the art.

In various embodiments, the policy engine 130 can be or include software instructions, a software program, a software application, or dedicated hardware, such as an application-specific integrated circuit (ASIC) or a field-programmable gate array (FPGA), among other things. In various embodiments, the policy engine 130 can implement some, a portion of, or all of the processes, functions, and/or operations described herein, including those related to measuring, calculating, and/or reporting the information loss caused by applying a policy 217 to a data source 125 and to selecting and/or applying a specified policy to the data source 125.

Various embodiments of the system 100 may enable an admin user 135 to objectively balance utility and privacy and understand that these are two complimentary things, and can also automatically provide an objective indication of the highest available utility for a group of possible privacy policies or the highest available privacy level for a target utility. Various embodiments of the system 100 can provide an automated calculation of the information loss, which represents a tradeoff, and instigate the selection and application of an appropriate policy(ies).

Other embodiments may similarly provide a system for measuring privacy built upon this framework. Such embodiments can enable a holistical understanding of the privacy-utility trade off associated with various policies and obscuring techniques, and objective selections of policies and techniques that preserve and provide the needed information from a dataset while maintaining a minimum threshold of privacy.

One of ordinary skill will recognize that the components, arrangement, and implementation details of the system 100 are examples presented for conciseness and clarity of explanation. Other components, implementation details, and variations may be used, including adding, combining, or subtracting components. For example, there may be two or more data sources 125, some or all of which are external to the computing system 115. For another example, the admin device 110 may be removed and its functionality implemented by the computing system 115, which may provide a user interface for the admin user 135 via an I/O device 233 as described in FIG. 2. For yet another example, the client device 110 and the admin device 140 may be combined into a single device with multiple, different functions for different users 105, 135.

Figure 2:
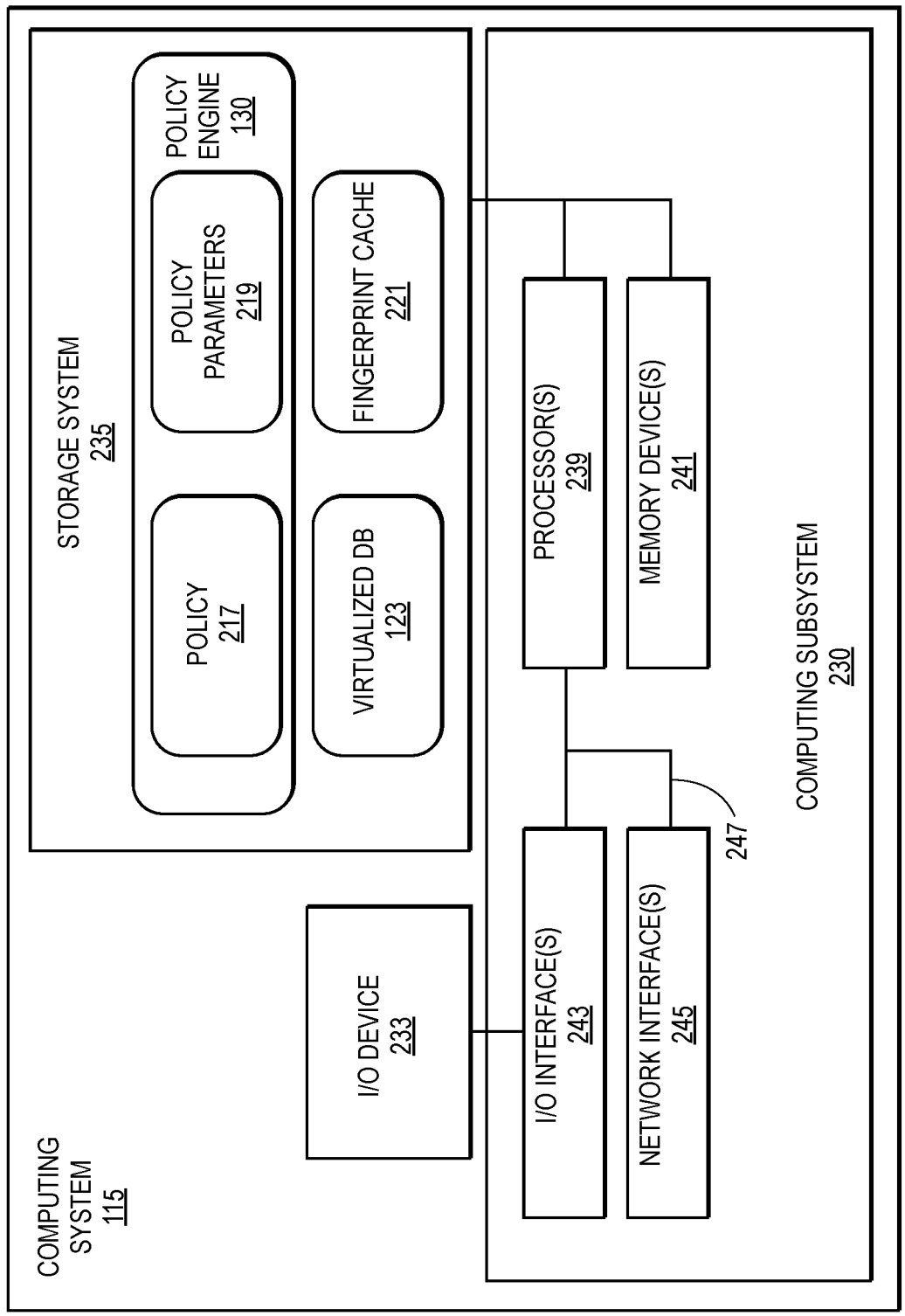
FIG. 2 shows a system block diagram illustrating an example of a computing system, in accordance with aspects of the present disclosure.

FIG. 2 shows a system block diagram illustrating an example of the computing system 115, in accordance with aspects of the present disclosure. As shown in this example, the computing system 115 can include a computing subsystem 230, an input/output (I/O) device 233, and a storage system 235. The I/O device 233 can be or include any device that enables an individual (e.g., an operator, a user, and/or consumer) to interact with the computing subsystem 230 and/or any device that enables the computing subsystem 230 to communicate with one or more other computing devices (e.g., client device 110, admin device 140) using any type of communications link (e.g., communication links 120, 150). The I/O device 233 can include, for example, a touchscreen display, pointer device, keyboard, etc. In various implementations, the I/O device can provide a network interface for the computing system 115 to connect with another computing device (e.g., client device 110, admin device 140, a data source 125).

The storage system 235 can be or include a computer-readable, non-volatile, hardware data storage device that stores information and/or program instructions. For example, the storage system 235 can be one or more solid state memories and/or hard disk drives. In accordance with aspects of the present disclosure, the storage system 235 can store or include the policy engine 130, the policy 217, policy parameters 219, a fingerprint cache 221, and the virtualized database 123, which can be the same or similar to that previously described. One of ordinary skill will recognize that the storage system 235 can store multiple instances of these items, such as multiple policies 217 and their associated policy parameters 219. One of ordinary skill will further recognize that depicting the policy 217 and the policy parameters 219 as part of the policy engine 130 is a design choice, and other implementations may organize the policy 217 and the policy parameters 219 separate from the policy engine 130.

In various embodiments, the computing subsystem 230 can include one or more processors 239 (e.g., a microprocessor, a microchip, or an application-specific integrated circuit), one or more memory devices 241 (e.g., random access memory (RAM) and read only memory (ROM)), one or more I/O interfaces 243, and one or more network interfaces 245. The memory device 241 can be a local, high-speed memory (e.g., RAM and a cache memory) employed during execution of program instructions by the processor 239. Additionally, the computing subsystem 230 includes at least one communication channel 247 (e.g., a data bus) by which it communicates internally and with the I/O device 233 and the storage system 235. In the example shown, the processor 239 executes computer program instructions (e.g., an operating system and/or application programs, e.g., an implementation of the policy engine 130), which can be stored in the memory device 241 and/or the storage system 235. For example, the processor 239 can execute the computer program instructions of the policy engine 130, which functions to, among other things described herein, process queries (e.g., query 117) and respond by producing differentially private (e.g., obscured according to a privacy policy 217) query results (e.g., result 119).

It is noted that the computing subsystem 230 is only representative of various possible equivalent computing devices that can perform the processes, functions, and operations described herein. To this extent, in embodiments, the functionality provided by the computing subsystem 230 can be provided by any combination of general purpose hardware, and/or specific purpose hardware (e.g., ASIC, FPGA), and/or computer program instructions. In each embodiment, the program instructions and hardware can be created using standard programming and engineering techniques, respectively.

The fingerprint cache 221 stores at least one fingerprint, which is a series of measurements and artifacts about the data source 125. A fingerprint represents the data in a data source 125 in various ways. In various implementations, the fingerprint cache 221 may store multiple fingerprints: there may be one fingerprint for each of several different data sources 125, and/or there may be two or more fingerprints for a single data source 125.

In various implementations, a fingerprint is a collection of data that is derived and/or measured from a data source 125, and which describes or represents the data source 125. The fingerprint can be used to assess the impact of a privacy policy 217 and its associated parameters 219 on the information and/or utility of the data source 125. The measurements included in a fingerprint can comprise, but are not limited to, distributional statistics such as counts, averages, variances, distributional moments, common factors, frequencies of occurrence of these factors, typical string structures, etc., where these measurements, statistics, and calculations may have been made by the policy engine 130 on the data in the data source 125. The artifacts included in a fingerprint can comprise, but are not limited to, data structures such as bloom filters, raw observations, probabilistic sketches, etc. As used herein, each element (e.g., each measurement or artifact) of the fingerprint may be referred to as a "ridge".

One of ordinary skill will recognize that the components, arrangement, and implementation details of the computing system 115 are examples presented for conciseness and clarity of explanation. Other components, implementation details, and variations may be used, including adding, combining, or subtracting components and functions.

Figure 3:
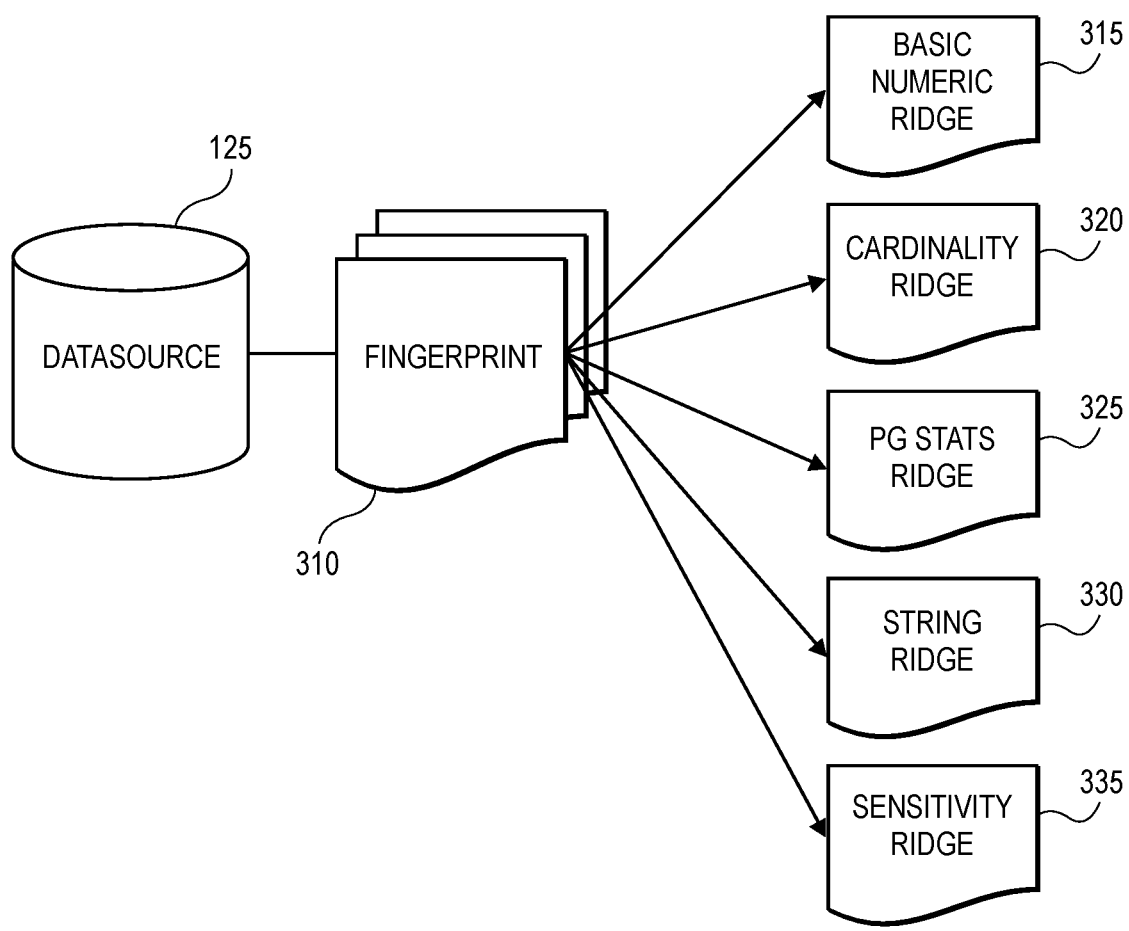
FIG. 3 is a block diagram showing an example of the relationships between data sources, fingerprints, and ridges, in accordance with aspects of the present disclosure.

FIG. 3 shows an example of the relationships between a data source 125, a fingerprint 310, and a set of ridges 315-335. As shown in this example, the basic numeric ridge 315, the cardinality ridge 320, the PG (Postgres) stats ridge 325, the string ridge 330, and the sensitivity ridge 335 make up the fingerprint 310 that describes and represents the data source 125. In various implementations, the ridges may include numeric statistics, descriptive statistics, timestamp statistics, lists of the most frequently occurring values, other frequency metrics, etc. that are used in measuring, estimating, or calculating the information loss caused by a policy 217, e.g., when applied to a specified dataset (e.g., to a column) of the data source 125.

For example, the basic numeric ridge 315 can include (e.g. store) a series of descriptive calculation results, artifacts, statistics, etc. about any numeric data within the data source 125, such as the numeric data that is within a column of data from a data source 125. For example, the system 115 executing the policy engine 130 may measure and/or calculate several descriptive statistics from a column of data (e.g., a dataset from the data source 125) that contains numbers. In various implementations, the statistics may include, e.g., the mean, the median, the mode, etc. of the column, which can be stored as part of the basic numeric ridge 315. Similarly, the system 115 and policy engine 130 may calculate or create a histogram for the column's dataset, which can be stored as part of the basic numeric ridge 315.

The measures, metrics, and statics stored in the basic numeric ridge 315 are used by the system 115 for calculating the information loss caused by a given privacy policy 217 when applied to the numeric dataset. For example, consider the example where the dataset (e.g., a column of data in a spreadsheet) contains numeric annual income data. If the policy 217 for the income dataset calls for generalizing (e.g., rounding off) the data to the nearest $10,000, then there is a significant amount of information loss, particularly compared to, for example, rounding off the annual income data to the nearest $100. Moreover, the amount of information lost depends on the characteristics of the raw, un-obscured data that is in the dataset. For example, if the raw data all falls in the range of $0-$15,000 and the policy 217 for the income dataset calls for generalizing the data to the nearest $10,000, then almost all of the information in the dataset will be lost after applying the rounding policy; whereas if the raw data all falls in the range of $150,000-$500,000 and the policy 217 for the income dataset calls for generalizing the data to the nearest $10,000, then very little of the information in the dataset will be lost after applying the policy.

For another example, the cardinality ridge 320 can include (e.g. store) a series of descriptive calculation results, artifacts, statistics, etc. about any set-type data within the data source 125, for example, string data that is within a column of data from a data source 125. For instance, the system 115 executing the policy engine 130 may measure and/or calculate several descriptive statistics from a column of data (e.g., from the data source 125) that contains a finite set of character or numeric values, such as a set of character strings that were chosen from a finite list of strings, or a set of ZIP code numbers.

The measures, metrics, and statics stored in the cardinality ridge 320 are used by the system 115 for calculating the information loss caused by a given privacy policy 217 when applied the data from which the cardinality ridge 320 was generated. For example, consider the example where the dataset (e.g., a column of data in a spreadsheet) contains U.S. state names, which could be any string from a set of fifty different state-name strings, where the cardinality ridge 320 may include, among other things, a representation (e.g., a percentage) of the number of times each of the fifty names occurs in the dataset.

The PG stats ridge 325 can include (e.g. store) a series of descriptive calculation results, artifacts, statistics, etc. about internal processes used by a Postgres implementation to service a query, which is not useful within an information loss context, but is included for completeness.

The string ridge 330 can include (e.g. store) a series of descriptive calculation results, artifacts, statistics, etc. about a dataset (e.g., column) that consists of character strings. An example of such a dataset is the above-mentioned dataset that contains U.S. state names, which could be any string from a set of fifty different state-name strings.

The sensitivity ridge 335 can include (e.g. store) a series of descriptive calculation results, artifacts, statistics, etc. about a dataset (e.g., column) that contains information which is automatically classified by the system as sensitive information, for example, social security numbers, credit card numbers, birth dates, and the like. In various embodiments, the system 115 can use a predefined dictionary of common patterns for sensitive information (e.g., numeric data in format xxx-xx-xxxx, which is a format commonly used for social security numbers) to identify datasets or columns that contain sensitive information within a data source 125.

Several of the ridges will be described in greater detail below with respect to FIGS. 5-8.

It should be noted that although FIG. 3 shows only one each of ridges 315-335 for the sake of clarity and ease of explanation, in various implementations, a fingerprint 310 may include multiple instances of each of the ridges 315-335, according to how may columns of corresponding data are contained in the data source 125. For example, if the data source 125 contains 10 columns of numeric data, then the fingerprint 310 may have 10 different instances of the basic numeric ridge 315, one for each numeric-data column/dataset.

Figure 4A:
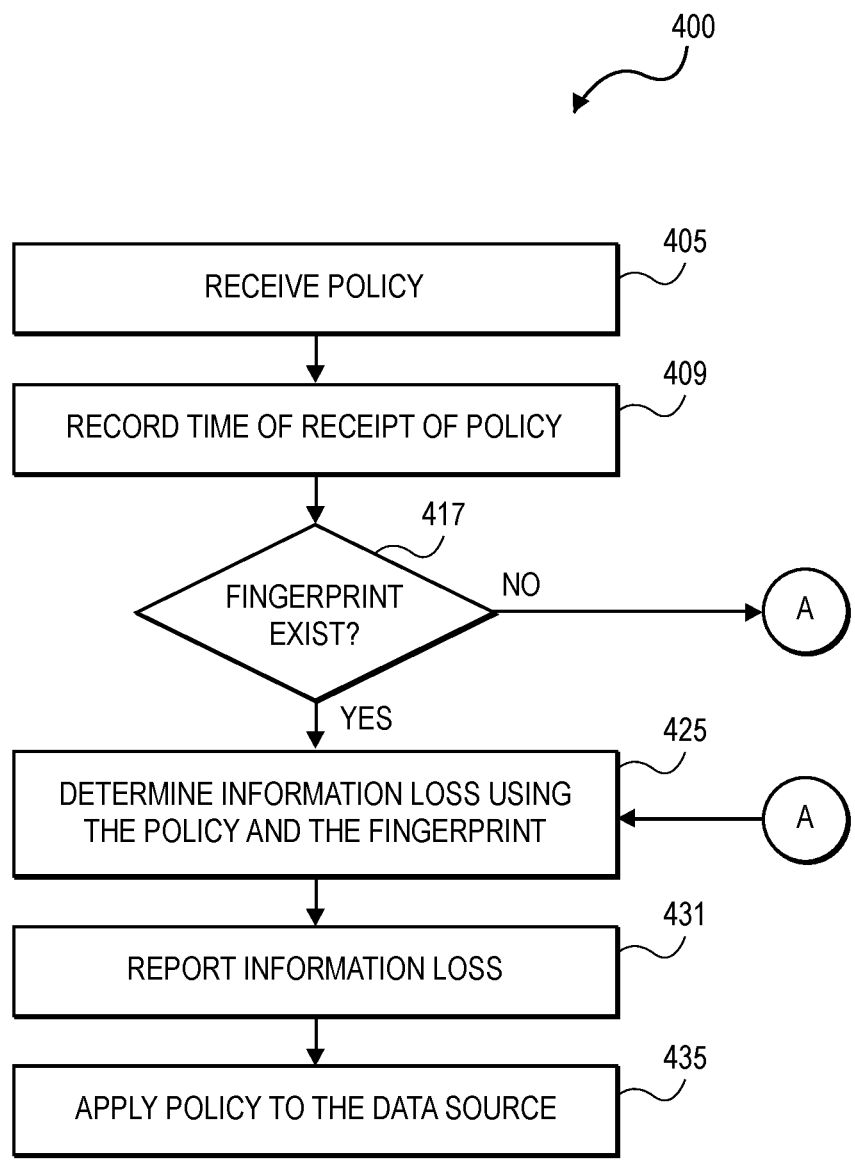
FIG. 4A is a flowchart of an example of a process for determining information loss and applying a policy to a data source, in accordance with aspects of the present disclosure.
Figure 4B:
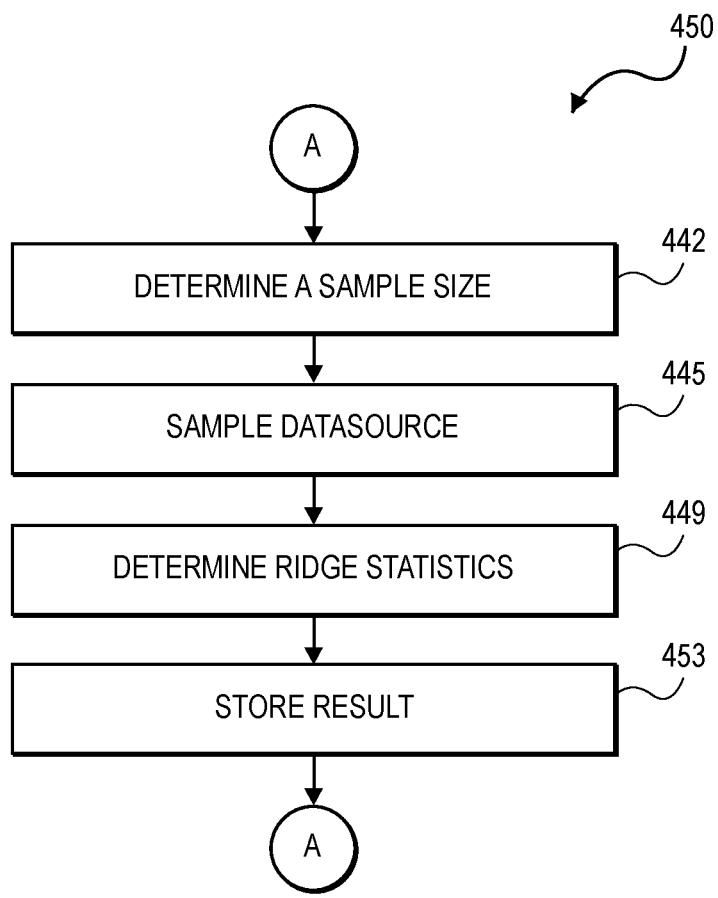
FIG. 4B is a flowchart of an example of a process for generating a fingerprint, in accordance with aspects of the present disclosure.
Figure 4C:
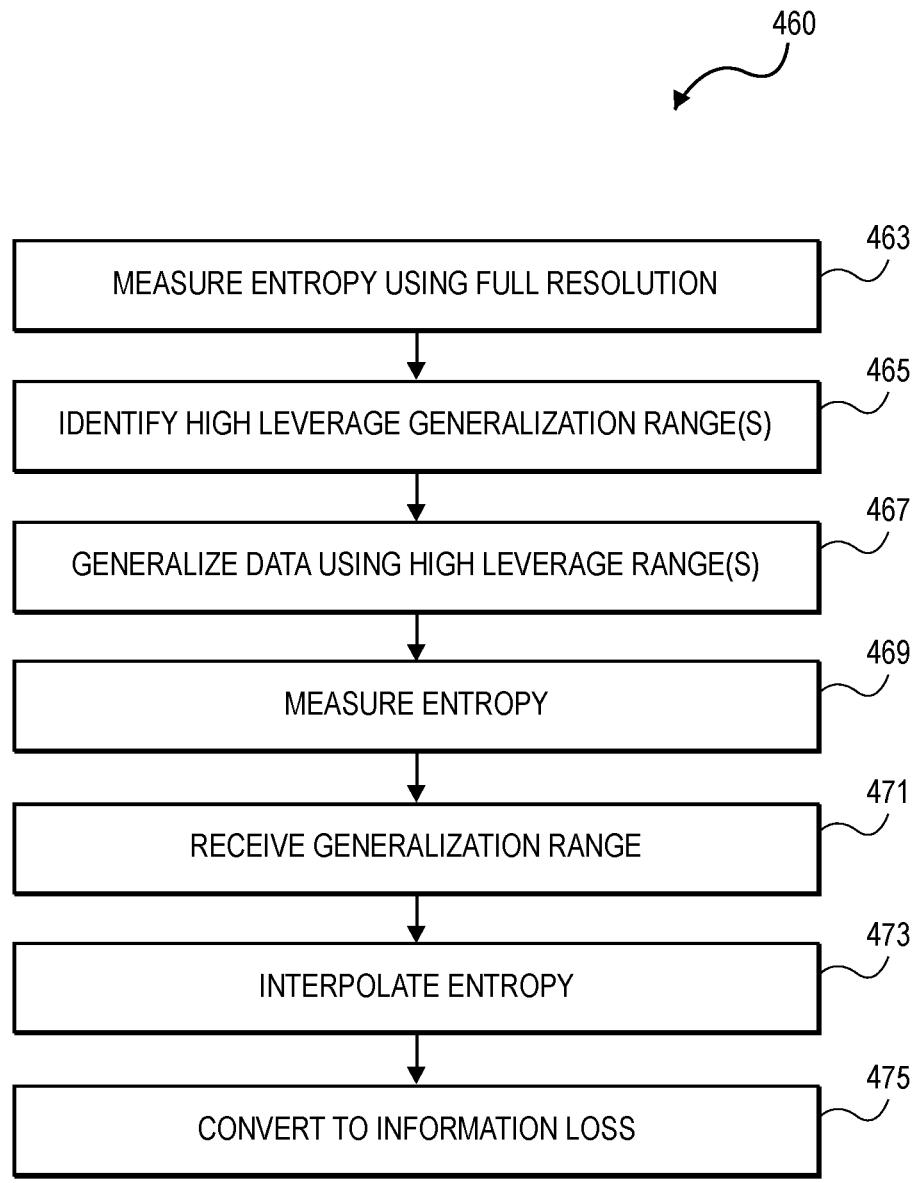
FIG. 4C is a flowchart of an example of a process for measuring the information loss caused by a policy, in accordance with aspects of the present disclosure.

FIGS. 4A-C show examples of processes for generating a fingerprint and measuring the impact (e.g., information loss) of policies upon the underlying data.

FIG. 4A is block diagram of an example of a method or process 400 for objectively determining information loss and applying a privacy policy to a fingerprint, according to an implementation of the invention. In some embodiments, all or part of the process 400 may be implemented by the computing system 115, for example by executing the policy engine 130.

In the example shown, at block 405, the computing system 115 receives a privacy policy 217 and its associated parameters 219, e.g., from the admin device 140 associated with the admin user 135.

In some use cases, the admin user 135, or an application running on the admin device 140, may submit or select a policy 217 for the purpose of determining how much information loss would be caused by applying the policy 217 to a specific data source 125. The policy 217 may then be either applied to the data source 125 at the end of the process 400, or not, based on the amount of information loss calculated by the system 115. If not, then the admin user 135/admin device 140 may send or select another, different policy 217, to repeat the process 400 in order to find out its associated information loss and apply it to the data source 125 if the information loss versus utility balance is satisfactory, e.g., above a predetermined threshold.

In various implementations, the policy 217 may include or specify one or more different types and/or instances of data obscuration, which are applied on a column by column basis to specified columns of the data source 125. In such implementations, the admin user 135 and/or admin device 140 may define or specify in the policy what is obscured per column, which affects what can be seen or accessed by the query user 105 or an application executing on a client device 110.

In some embodiments, the admin user 135 can select a policy 217 from a predetermined group of policies or may otherwise define the policy 217 to provide to the system at block 405.

The system 115 can record the time of policy receipt at block 409. In various embodiments, the recorded time and policy information may be used to form a log or record of the activities of the admin user 135, which may be useful if the admin user 135 wishes to recreate a policy or the like that the admin user 135 had created or used in the past.

At block 417, the system 115 does a check to determine whether a fingerprint (e.g., fingerprint 310) of the data source 125 exists. In various embodiments, this may be done, for example, by determining whether there is a fingerprint file 310 for the data source 125 in the fingerprint cache 221.

In some implementations, the admin user 135 may specify to the system 115 which data source(s) 125 to use from among a plurality of data sources which with the system 115 functions; while in other implementations, the system 115 may be dedicated to one specific data source 125.

In some implementations, after determining that a fingerprint 310 representing the data source 125 exists, an additional check (not shown) may be executed in conjunction with block 417 to determine whether the existing fingerprint 310 is recent enough to use. For example, the system 115 may determine whether or not the existing fingerprint file 310 was created after a predetermined time in the past, such as one day ago, two days ago, five days ago, seven days ago, 14 days ago, 30 days ago, 60 days ago, 90 days ago, one year ago, or the like. This predetermined time may be based on how often and/or how much the data in a data source 125 is changed or is updated; e.g., the more often the data changes, the shorter the predetermined time-in-the past threshold.

If a fingerprint does not exit (or optionally if it is older than the time-in-the past threshold (e.g., more than 14 days old)), (317 No), then a new fingerprint 310 is generated from the data source 125, for example, using the process for fingerprint generation as shown in FIG. 4B.

If the fingerprint 310 exits (and optionally if it is not older than the time-in-the past threshold (e.g., not more than 14 days old)) (317, yes), then the process 400 proceeds to block 425.

At block 425, the system 115 determines the information loss using the policy 217 that was received at block 405 and the fingerprint 310 of the data source 125. In some implementations, the information loss produced by the policy 217 can be measured, calculated, or evaluated for a single column of the data source 125 that is represented by the fingerprint 310. While in other implementations, the information loss produced by the policy 217 can be measured, calculated, or evaluated for multiple columns, e.g., on a column by column basis, and the fingerprint 310 may have different ridges for different columns of the data source 125. In some implementations, the system 115 may weight some columns (e.g., columns with extremely sensitive information, such as SSN) more heavily than others in quantifying the information loss. A detailed example of a process for determining the information loss is shown in FIG. 4C.

In various implementations of block 425, the system 115 calculates a measurement of the disparity between a dataset (e.g., column of data) with and without the policy 217 applied; or in other words, an estimate of the amount of obscuration of the data that would be induced by the application of the policy 217. In various implementations, the system 115 can produce this information-loss estimate in the form of a number on a scale from zero to one. For example, an information-loss estimate of 1.00 means the policy 217 completely obliterated all information in the dataset; while an information-loss estimate of 0.00 means the policy 217 made no change to the original dataset. Similarly, an information-loss estimate of 0.05 means the policy 217 had very little impact on the dataset, e.g., it obscured very little of the data and/or changed or hid the data in a minor way; while an information-loss estimate of 0.95 means the policy 217 had a large impact on the data, e.g., it obscured much of the data and/or changed or hid most of the data.

In various embodiments, the system 115 determines information loss by comparing the obscured data that is visible or accessible to a query user 105/client device 110 after the policy 217 is applied, to the un-obscured raw data and quantifying the difference. This may be calculated, in some implementations, as a reduction in resolution caused by the obscuration policy. As another example, in some implementations, the system 115 may calculate the percentage of information that is redacted or suppressed by the policy 217. For instance, for a dataset (e.g., column) that contains nine digit social security numbers, if a policy 217 removes or suppresses the first three digits of the dataset (i.e., a query user 105 can see only the last six digits of the social security numbers), then the system 115 may calculate an information loss value of 0.33 (i.e., 3/9) for the policy 217 as applied to this dataset; similarly, if a policy 217 removes or suppresses the first five digits of the dataset (i.e., a query user 105 can see only the last four digits of the social security numbers), then the system 115 may calculate an information loss value of 0.56 (i.e., 5/9) for the policy 217 and this dataset. In another example, for a dataset (e.g., column) that contains state names, if a policy 217 removes or suppresses the rows of the data source 125 that contain Wyoming as the state name (i.e., a query user 105 can see only the rows from states other than Wyoming), then the system 115 may count or otherwise measure the number of occurrences of "Wyoming" in the "State Name" column and divide that by the total number of rows in order to calculate an information loss value. In this example, if the number of occurrences of Wyoming is 578 and the total number of rows in the dataset is 32,753, then the system 115 may calculate an information loss value of 0.02 for the policy 217 of suppressing the Wyoming rows in this dataset.

In various implementations, the system 115 can additionally or alternatively calculate and generate other information-loss metrics and information besides the above-described information-loss estimate number on a scale from zero to one. For example, in the case of a rounding policy, the system 115 can generate one or more histograms of the rounded and/or unrounded dataset and/or various statistical metrics representing the rounded and/or unrounded dataset.

In some of the embodiments described above, the information-loss estimate number represents the information loss for one column of data after application of a policy to that column. Additionally or alternatively, the system 115 can calculate or determine an information-loss estimate number for, or that takes into account, other part(s) of the data source 125 in addition to the column to which the policy 217 was applied, where these other part(s) of the data source 125 are secondarily affected by the application of the policy. This is particularly applicable for policies that remove rows of data based on the values in a specific column(s), because the removed rows will skew or affect the makeup of the data in all, or most of, the other rows to various degrees.

For example, consider the case of a policy 217 that suppresses or removes rows from a data source 125 based on a specific value in a specific column, such as removing the rows that have the value "Wisconsin" in a "State Name" column. Further consider that the data source 125 also has another column for "Occupation," which includes character strings for the occupation "dairy farmer." Because there are a large number of dairy farmers in Wisconsin compared to most other states (i.e., non-uniformities in the population), removing the "Wisconsin" rows has a significant secondary effect on the content and makeup of the "Occupation" column dataset, causing a disproportionate amount of information loss or disparity in the amount of dairy farmers in the Occupation column; i.e., after the policy is applied, the percentage of dairy farmers across all occupations is significantly lower than in the raw dataset. Various embodiments consistent with the invention take this into account when determining information loss, for example, by calculating an information-loss estimate for some or all columns if a policy 127 specifies removal of rows of data.

At block 431, the system 115 reports the calculated, quantified information loss to the admin user 135 and/or the admin device 140, for example, in an information-loss report 139.

Figure 10A:
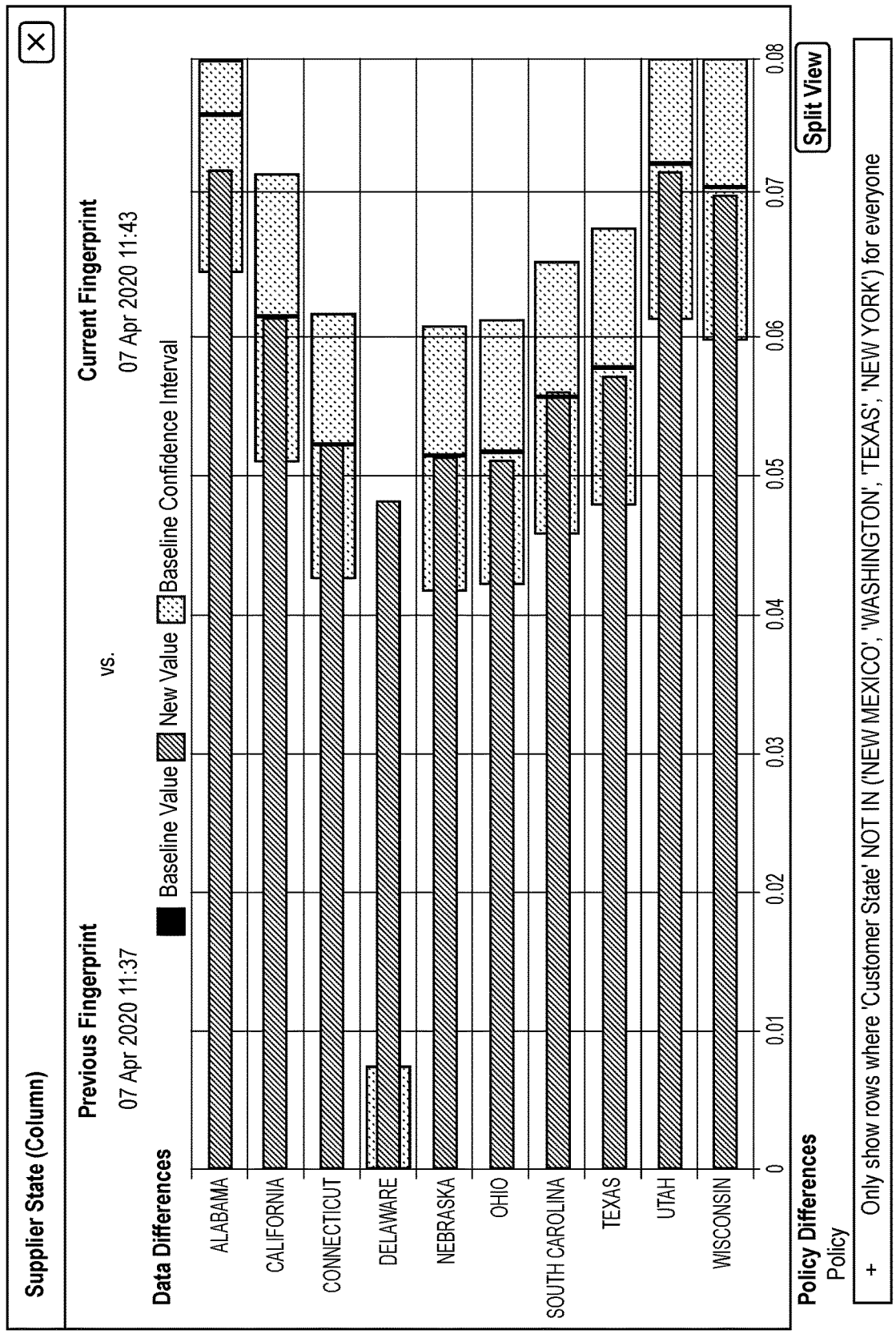
FIG. 10A shows a screen shot of an example of an information loss report, in accordance with aspects of the present disclosure.
Figure 10B:
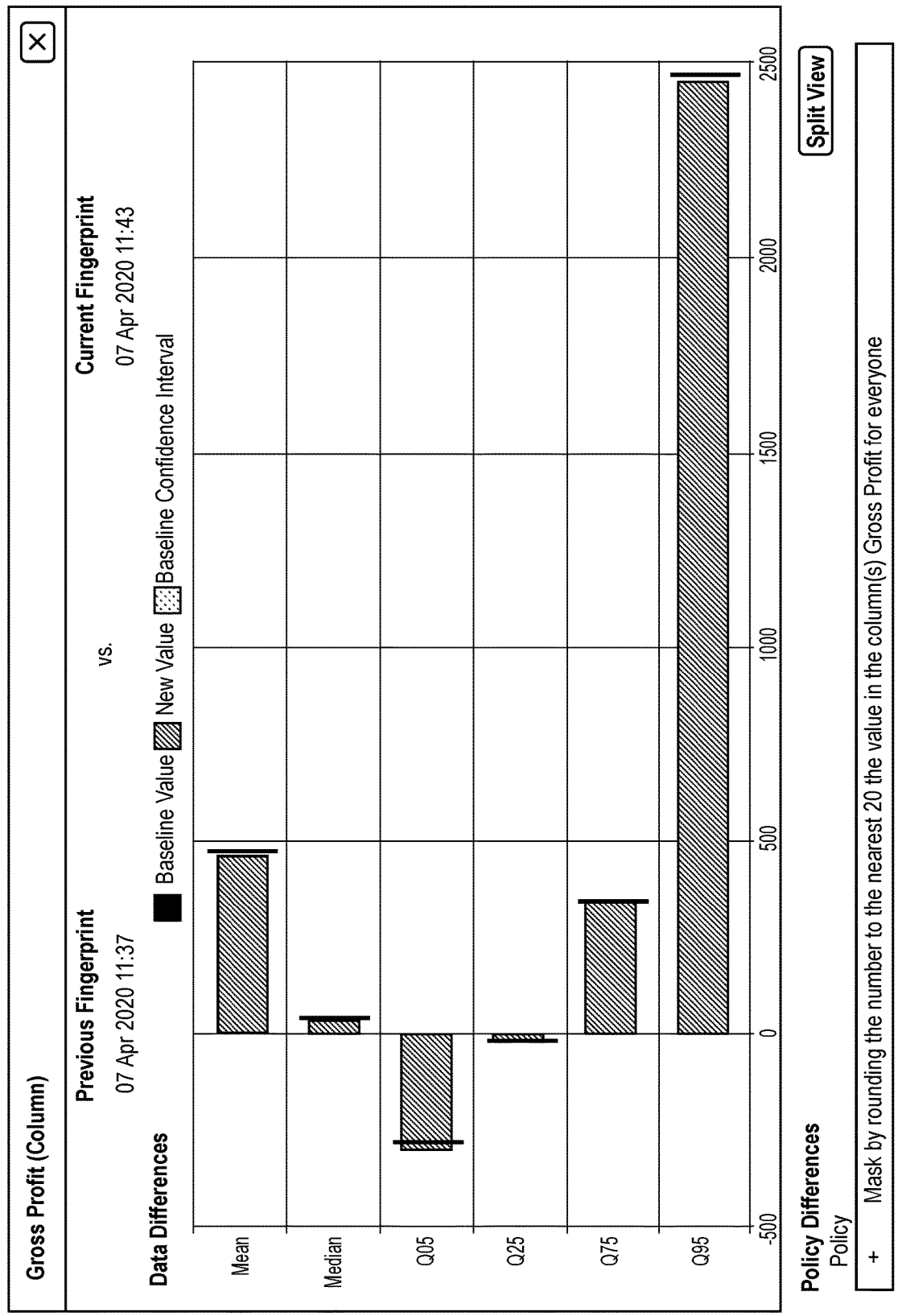
FIG. 10B shows a screen shot of another example of an information loss report, in accordance with aspects of the present disclosure.

FIG. 10A shows an example of how information-loss information is presented to the user for categorical data. In this figure, the cross-hatched "new value" bars show the frequency of a value after a data policy is applied. The dotted "baseline confidence interval" regions show the frequency of a value without any policy. And, the heavy vertical lines in the baseline confidence interval regions show the baseline value for the attribute (e.g., the data from the "Supplier State" column). In the example of information-loss information shown in FIG. 10A, as shown at the bottom, records from the states of WASHINGTON, NEW MEXICO, TEXAS, and NEW YORK are removed from the dataset, perturbing the relative frequencies of the remaining items away from their baseline values in several instances, although all except DELAWARE are within their baseline confidence interval regions. FIG. 10B shows an example of an information-loss report that was generated for numeric data. In this example, a generalization policy is applied to the "Gross Profit" column on a table, slightly perturbing the descriptive statistics of the underlying data away from their baseline values. FIG. 10C shows an example of information-loss information in the form of a summary of the differences, over all columns, produced by the applied policy. The severity value for each row gives a statistical quantification (e.g., on a scale of 0.000 to 1.000) of how different each column's distribution is from its baseline in the presence of the new policy.

Referring again to FIG. 4A, in some implementations, the admin user 135 and/or an application running on the admin device 140 may evaluate the reported information-loss information to determine whether or not the policy 217 from block 405 provides sufficient privacy (e.g., a high enough amount of information loss to protect sensitive data) and/or sufficient utility (e.g., a low enough amount of information loss for the data in the result 119 to be useful for a specific purpose). And, by considering the system's objectively calculated information-loss information, the admin user 135 can get a qualitative feel for how much the data is impacted by a policy and/or by a change from one policy to another.

In some such implementations, the admin user 135 and/or the admin device 140 can, for example, compare the information-loss estimate number (e.g., ranging from 0.00 to 1.00 as described above) to a target information-loss number, plus or minus some tolerance(s), such as +0.05 and −0.02. And, if the calculated information-loss estimate number does not match the target information-loss number plus or minus the tolerances, then the admin user 135 and/or the admin device 140 may iteratively provide a new or adjusted policy 217 at block 405 for the process 400 to evaluate, until the target information-loss number is reached. Otherwise, when the calculated information-loss estimate number matches the target information-loss number plus or minus the tolerances, then the process 400 can proceed to block 435.

At block 435, the system 115 applies the policy 217 to the data source 125. In various implementations, this may include storing the policy 217 and its associated parameters 219 in the storage system 235, and subsequently processing each query 117 to determine whether the stored policy 217 and its associated parameters 219 are applicable to the particular query user 105, data source 125, and/or virtualized database 123 specified by the query 117. If a received query 217 is one that the privacy policy 217 covers, then the system 115 applies the obscuring techniques specified by the policy 217 to the query-responsive data before the result 119 is provided to the client device 110. Thus, the query user 105 can only access or see the requested data after the data has been obscured according to the applicable privacy policy 217.

As noted previously, in some embodiments, the functionality of the admin device 140 can be implemented by the computing system 115, and a software application or the like may take the place of the admin user 135, such that the operations 431 and 435 can be automatically done based on the determined information-loss estimate matching a predetermined target information-loss number, plus or minus a tolerance(s). In such embodiments, the system 115 can automatically trigger or control the application of a policy that is objectively selected to meet a specific information loss requirement, without run-time input from the admin user 135.

FIG. 4B is a block diagram showing an example of a fingerprint generation process 450. In some embodiments, all or part of the process 450 may be implemented by the computing system 115, for example by executing the policy engine 130. As noted with regard to FIG. 3, a fingerprint 310 can be implemented as a set collection of ridges, each of which may be a file or data structure containing measurements, statistics, artifacts, or the like that are measured or derived from a data source 125, e.g., from a column or other dataset in the data source 125.

In various embodiments, the process 450 will generate one or more of the ridges 315, 320, 330, 335 for a dataset (e.g., a column) of the data source 125, depending on the type of data in the dataset. For example, if a column contains numerical data, such as in a column that records "age in years" or "annual income," then the system 115 will generate a numeric ridge 315 for that dataset. For another example, if the column contains string data, such as the string-type attributes "yes" or "no" in a column that records the yes/no answer to "U.S. Citizen?" or "Employed?", then the system 115 will generate a cardinality ridge 315 for that dataset.

In some embodiments, the system 115 may interact with the admin user 135 to provide a framework that enables the user 135 to develop and/or plug in new metrics/ridges that they have created.

In the example shown in FIG. 4B, the process 450 starts at block 442 by determining a sample size, which may be different for different ridges. For example, in the case of descriptive statistic ridges, the system 115 may determine the sample size based on or controlled by the minimum sample size required for the sampling error to begin to show asymptotic behavior. Other standard statistical techniques instead of asymptotic behavior can also be used to calculate a sample size that is, for example, statistically significant. In some implementations, the sample size may be predefined based on the table size or number of rows, and determining the sample size at 442 may simply involve looking it up. For example, when the table or column has a size 1-1000 (e.g. having 1-1000 rows), the sample size=the table size; when the table or column has a size 1001-5000, the sample size=1000; when the table or column has a size 5001-10000, the sample size=2000; etc.

For another example, in the case of sketching approaches, (e.g. count-min sketch), the system 115 may determine the sample size based on linear table scans of the data source 125.

Once the sample size is determined, at block 445 the system 115 samples the data source 125 in accordance with the determined sample size to create a representative sample of, e.g., the data in a column of the data source 125. In various implementations, the system 115 may employ randomized sampling, stratified sampling, hypercube sampling, linear table scan, or other appropriate sampling regimes.

Using this representative sample, at block 439 the system 115 determines the ridge statistics by performing the procedures, algorithms, calculations, and/or operations that produce the contents of a ridge, which contents are different for each of the different ridge types 315-335. Ridge statistics are any descriptive statistics that can be measured on a random sample of data. These statistics can include, but are not limited to, averages, variances, categorical counts, histograms, covariances, etc.

For example, in the case of a cardinality ridge 315 (see FIG. 6 for additional details), the system 115: employs a standard statistical algorithm to estimate the number of unobserved attributes or values that are missing from the representative sample; determines the cardinality of the representative sample by counting the actual number of different attributes in the sample; employs a standard statistical algorithm to extrapolate the cardinality of the raw dataset (e.g., of the data source 125) based on the number of unobserved attributes and the cardinality of the representative sample; calculates the number of distinct attributes as a percentage; calculates the percentage of the number of unobserved attributes in the sample size; stores the size of the representative sample; calculates the percentage of the size of the representative sample over the size of the entire dataset; and calculates the percentage of appearance or occurrence of the most common attributes—for example the percentage of occurrence of the top 20 most common attributes.

At block 453, the system 115 stores the ridge statics, for example in a file or data structure for one of the ridge types 315-335, several of which may be associated to make a fingerprint 310. In various embodiments, the ridge statistics/files may be stored in the fingerprint cache 221. The stored fingerprint 310 (i.e., set of ridges) is used to measure and estimate the impact of a privacy policy 217 on the underlying data source 125, e.g., as described above with respect to block 425 and elsewhere herein.

FIG. 4C is a block diagram showing an example of a process 460 for determining information loss for a policy 217 using the fingerprint 310 of a data source 125. This example uses precomputed ranges, which may be stored as part of the fingerprint 310. Thus, in different implementations, blocks 463-469 of the process 460 can be performed as part of a fingerprinting process, such as added on as part of the process 450 shown in FIG. 4B, and the results stored in a ridge of the fingerprint 310 for use by the process 460 when needed.

In the example shown, at block 463, the system 115 measures the entropy of the representative sample (see block 445 of FIG. 4B) from the data source 125, with no policies applied, to get a baseline measurement. In some embodiments, the entropy can be measured using an information theory measurement such as Shannon's entropy. Entropy is closely related to information loss, and entropy may be thought of as a measure of the amount of information in a dataset; thus it is analogous to the converse of information loss. That is, a decrease in entropy represents an increase in information loss.

In measuring the impact of a privacy policy and its obscuration technique(s) on a dataset, it is noted that entropy will be maximized without any policies applied to the dataset. Furthermore, as the set $x_{Support}$ becomes more discrete, entropy will decrease monotonically.

At block 465 the process 460 identifies any high-leverage generalization ranges in the representative sample, where a high-leverage generalization range is a portion or series of data points where a rapid change in entropy is identified. One example would be at or above the average interstitial distance between an ordered list of observations. These high leverage points or ranges indicate where the entropy curve is best sampled to reduce the error in interpolating the curve, (for example to calculate an information-loss value at block 473).

In various implementations, the system 115 can identify the high-leverage generalization range(s) by applying a series of generalization values (e.g., rounding values, such as round to the nearest $1000, $2000, $3000, $4000, $5000, etc.) to the representative sample and measuring the entropy throughout the series until the entropy nears zero, which will generate a curve. The system 115 can then look for inflexion point(s) or an inflexion range(s) on that curve where the entropy changes significantly (e.g., the curve becomes steeper), which is the high leverage generalization range(s).

Once a high leverage generalization range is identified, at block 467, the system 115 can create a new series of generalization values (i.e., the high leverage generalization points) that span the high leverage generalization range (e.g., in $100 increments to continue the previous example) and apply them to the representative sample in the high leverage generalization range, and then at block 469, calculate or measure the entropy for each of the points to obtain a dense number of entropy data points in the high leverage range. The group of entropy measurements can form the basis of a piecewise interpolant (e.g., a piecewise polynomial curve), which is stored by the system 115, (e.g., as part of a fingerprint 310). Thus, the piecewise interpolant has, rather than uniform sampling throughout, a denser sampling in the high-leverage range(s) where the entropy curve is steep, which significantly decreases the error from interpolation using the curve to generate an entropy estimate, and indirectly, an information-loss estimate.

At block 471, the system 115 receives a generalization range or value (e.g., a value to which to round a column of data), for example from the policy 217 that was received at block 405 of FIG. 4A.

At block 473, the system 115 uses the piecewise interpolant from block 469 (which may be part of the fingerprint 310) to approximate or estimate the entropy associated with the received generalization range or value from the policy 217, and by extension to estimate the information loss introduced by the policy 217. For example, if the dataset contains annual salary amounts, and the policy 217 specifies rounding to the nearest $3,500, the system looks up the piecewise interpolant for $3500 and gets or calculates the corresponding entropy estimate.

In various implementations, as noted, the calculated entropy from block 473 corresponds to, represents, or is an indirect measurement of the information loss. At block 475, the system 115 converts the entropy value into an information-loss estimate value.

Similarly, for obscuration types other than generalization, the system 115 can analyze the dataset and/or representative sample without and with the policy's obscuration applied, and the information content can be measured. The information content can be quantified using an information theoretic metric, such as Shannon's Entropy, a signal to noise ratio, or the like.

Shannon's Entropy is defined as the expectation value of the log of the probability of some observed outcome:

$$H(x) = -\sum_i p_i \log p_i$$

In this expression, $p_i$ is the probability of observing the $i^{th}$ value in a dataset. In this expression, H(x) is bounded between 0 and log(K), where K is the number of distinct values in a dataset. In various implementations, information loss can be measured as the change in H(x) introduced by the perturbation on an attribute. For example with a suppress technique or policy 987 (see FIG. 9), H(x) would be zero, making the information loss identically H(x) without policies applied. In the case of a generalize technique or policy 383, the values are mapped from a space of K values into a space of K' possible values, where K'<K. An obfuscate technique or policy 385, will typically, but not necessarily, maintain counting statistics, keeping H(x) constant and introducing no information loss.

A randomize technique or policy 389 will either maintain or increase a diversity of values into a dataset, and, in all cases, produce a more uniform distribution of values, leading to an increase in entropy. Under a Shannon's entropy construction, a randomize technique will create a deceptive increase in information content. In this scenario, various embodiments of the system 115 can more appropriately represent information loss as the change in the signal to noise ratio of the data. In general the Signal to Noise Ratio (SNR) is unknown in the data prior to policy application. However obscurations can either reduce signal or increase noise. As such the change in SNR can be modeled as follows:

$$SNR_{policy} = SNR_0 \times \left(1 - \frac{\alpha}{\beta}\right)$$

Where $\alpha$ denotes a decrease in signal and $\beta$ denotes an increase in noise. By convention $\alpha \geq 1$ and $\beta \leq 1$. In this way $SNR_{Policy} \leq SNR_0$, where $SNR_{Policy}$ is the SNR after the obscuration, and $SNR_0$ is the raw SNR. In the case of a randomize technique or policy 389, this amounts to quantifying the scale of noise added by the randomization process. Since randomization can be seen as convolving the true signal with some obscuring function, various embodiments can estimate the noise as an additive noise and quantify it using either information content of the noise or some other information theoretic measure.

One of ordinary skill will recognize that the processes 400, 450, and 460 of FIGS. 4A-C are presented for conciseness and clarity of explanation, and that blocks and operations may be added to, deleted from, reordered, performed in parallel, or modified within process 400 without departing from the principles of the invention. For example, in the process 400, blocks may be added to compare the information-loss estimate to a target information-loss number and either loop back to the top to try a different policy or automatically apply the policy. Other variations are possible within the scope of the invention.

FIG. 5 shows an example of the descriptive statistics, attributes, characteristics, calculated values, etc., of a basic numeric ridge 315, which in various embodiments can be generated by the system 115 from a dataset (e.g., a column of date from the data source 125) and stored in a file, a data structure, or the like, for example in the fingerprint cache 221.

In the example shown in FIG. 5, the system 115 has calculated a set of values and saved them in the data structure shown. In this example, IQR is the inner quartile range, which is a measure of statistical dispersion (e.g., the width of the distribution of the dataset). Q05, Q25, Q75, and Q95 are the fifth, $25^{th}$, $75^{th}$, and 95th quantiles of the dataset. Mean is the well-known statistical average value of the dataset. Median is the well-known statistical median value of the dataset. Keratosis, skewness and variance are the well-known standard descriptive statistics for this dataset.

Bin counts, bin size, and bin lower limits represent the measurements for a histogram for the dataset. Blurred min and blurred max represent the approximate min and max of the dataset, but with some random factor added so as to avoid disclosing actual raw data from the dataset in the fingerprint 210. Sample size the size of the dataset, here, 10,490 samples or rows. Percent nulls is the number of nulls in the dataset, expressed as a percentage of the total dataset. And, mean absolute deviation is that well-known standard descriptive statistic for this dataset.

As noted previously, in various embodiments, the system 115 will generate a numeric ridge, e.g., as shown in FIG. 5, only if the dataset contains numeric data. Thus, if the dataset consisted of character strings, for example, last names, then the system 115 will not generate a numeric ridge 315 for that data.

FIG. 6 shows an example of the frequency statistics, attributes, values, etc., of a cardinality ridge 320, which in various embodiments can be generated by the system 115 from a dataset (e.g., a column of date from the data source 125) and stored in a file, a data structure, or the like, for example in the fingerprint cache 221. In FIG. 6, the data from the cardinality ridge 320 is represented in a tabular format for ease of explanation and clarity.

In the example shown in FIG. 6, the raw dataset contained 10,490 samples or rows, and each sample contained a character string having a value or attribute of either "Y" (for yes) or "N" (for no). The system 115 analyzed the entire dataset to generate the fingerprint, and thus the size of the representative sample is the same as the size of the raw data set.

In the example shown, the top row 601 contains the number of unobserved attributes or values that are in the raw dataset but not in the representative sample used to generate this ridge, (i.e., that are unobserved in the representative sample), as calculated by the system 115. In various embodiments, the system 115 may perform standard statistical analysis to estimate the number of unobserved unique attributes, and then use that estimate to extrapolate the true cardinality of the dataset (row 602). In the example shown, because the sample size is equal to the data set size, there are zero unobserved attributes, as shown in the column labelled "Value".

The second row 602 contains the extrapolated cardinality of the dataset, as calculated by the system 115. In various embodiments, this can be calculated by adding the number of unobserved attributes (row 601) plus the cardinality of the samples (row 603).

The third row 603 contains the cardinality of the attributes in the representative sample (i.e., the number of distinct attributes in the sample), which is counted by the system 115. In this example, there are only two distinct attributes in the samples: "Y" and "N", and therefore the cardinality of the samples is 2. It is also noted that in this example, the extrapolated cardinality of the raw dataset is the same as the actual cardinality of the samples because the system 115 sampled the entire dataset.

The fourth row 604 contains the percentage of distinct attributes. Percent distinct is measured as the ratio between the extrapolated cardinality (row 602) and the total population. The total population is estimated by the sample size (row 606) divided by the sample fraction (row 607).

The fifth row 605 contains the percentage of null, which is calculated by the system 115 by dividing the number of unobserved attributes (row 601) by the total population.

The sixth row 606 contains the size of the sample taken from the raw data source 125, which is counted by the system 115.

The seventh row 607 contains the sample fraction, which the system 115 calculates by dividing the sample size (row 606) by the size of the data source from which the sample is drawn. In this example, the sample size is equal to the data source size (e.g., all of the data in the data source was used in the sample), and thus the sample fraction is 1.0 or 100%.

The eighth row 608 contains the frequency of occurrence of the most commonly occurring attribute in the data set, which the system 115 calculates by dividing the number of occurrences by the total sample size (row 606). In this example, the attribute "N" is the most commonly occurring attribute, and it appeared in 99.3232% of the rows in the sample.

The ninth row 609 contains the frequency of occurrence of the second most commonly occurring attribute in the data set, which the system 115 calculates by dividing the number of occurrences for that attribute by the total sample size (row 606). In this example, the attribute "Y" is the second most commonly occurring attribute, and it appeared in 0.6768% of the rows in the sample.

In other examples of cardinality ridge data that have more than two attribute values, there may be a larger number of most common attribute rows similar to the eighth and ninth rows (608, 609) of FIG. 6. For example, the system 115 may determine and calculate the frequency of occurrence for the top five, 10, 20, 30, etc. most commonly occurring attributes, or for the number of attributes that together make up 60% of sample size, or the like. For example, if the dataset contained U.S. state names and the names appeared in the sample approximately in proportion to each state's population, then the four most common attribute rows starting at 608 might be California 11.9%, Texas 8.0%, Florida 6.8%, and New York 6.2%.

As noted previously, in various embodiments, the system 115 will generate a cardinality ridge 320, e.g., as shown in FIG. 6, only if the dataset contains a finite, repeating set of attributes, such as gender, occupation, city name, state name, and the like. If the dataset contains numeric attributes or a set of unique, non-repeating attributes, whether string or numeric, such as social security numbers or bank account numbers, then the system 115 will not generate a cardinality ridge 320 for that data.

FIG. 7 shows an example of the frequency statistics, attributes, values, etc., of a sensitivity ridge 335, which in various embodiments can be generated by the system 115 from a data source 125 and stored in a file, a data structure, or the like, for example in the fingerprint cache 221.

In various implementations, to generate the sensitivity ridge 335, the system 115 can, for example, assess, analyze, or calculate the contents of the data source 125 against predetermined descriptors that characterize various sensitive data types, including but not limited to SOCIAL SECURITY NUMBER, CREDIT CARD NUMBER, PASSPORT NUMBER, GENDER, and ADDRESS. Sensitive data types can be modeled using a combination of text patterns (for example the pattern for social security number would be 9 digits with hyphens between the third and fourth digit and fifth and sixth digits), checksums (for example credit card numbers), and list of known values (for example United States ZIP codes or genders). These patterns, dictionaries, and checksums are used to detect the presence of potentially sensitive data within a data source. FIG. 7 shows an example of the reported results for a data source. Each attribute (e.g., column) within a data source will have an entry in the sensitivity ridge 335, with each entry being a list of sensitive data types (if any) that match the pattern(s) in the data. In this example the "website," "gender," "passport," and "date_time_of_purchase" attributes are consistent with the sensitive data types "URL," "GENDER," "FRANCE_PASSPORT," and "DATE" and "TIME," respectively; while "purchase_amount" and "purchase_number" do not match any sensitive data types. The admin user 135 or an application running on the admin device 140 can use the information in the sensitivity ridge 335 to identify which attributes in a data source 125 are most sensitive and, for example, apply more restrictive policies (e.g., policies that cause more information loss) to their datasets, for example, based on a set of rules.

FIGS. 8A and 8B together show an example of the frequency statistics, attributes, values, etc., of a string ridge 330, which in various embodiments can be generated by the system 115 from a data source 125 (e.g., from the columns in a data source 125, where each column has its own entry or data structure) and stored in a file, a data structure, or the like, for example in the fingerprint cache 221.

In various implementations, to generate the string ridge 330, the system 115 can, for example, assess, analyze, or calculate the format and characteristics of strings attributes (e.g., columns) within the dataset. Similar to the cardinality ridge 320, this string ridge 330 contains the number of missing elements seen in each string attribute, expressed as a percentage, using the field "Percent NULL." In the example shown, the fields: Average String Length, Maximum String Length, and Minimum String Length, represent the average, maximum, and minimum number of characters in each string, respectively. Average White Space, Average Upper Case Characters, and Average Lower Case Characters represent the average number of character in each string that are spaces, upper case ([A-Z]), or lower case ([a-z]), respectively.

Each string is further decomposed into a regular expression. This is done by breaking each string down into a series of contiguous character types: upper case ([A-Z]), lower case ([a-z]), digits ([\d]), white space ([\s]), and everything character type ([^A-Za-z\\\d\\\s]). This decomposition is assembled into a regular expression that matches the observed string. The frequency of each unique regular expression is counted.

The field Leading Regular Expressions represents the most frequently occurring distinct regular expression. The field Leading Regular Expression Frequencies is the number of times each leading regular expression occurs. In various embodiments, the system 115 may use the results of the string ridge 330 to discover consistent patterns in the text, which may be used to augment the patterns within the sensitivity ridge 335 and discover unforeseen sensitive attributes, for example, provider-specific attributes such as medical plan numbers or medical record numbers.

Figure 9:
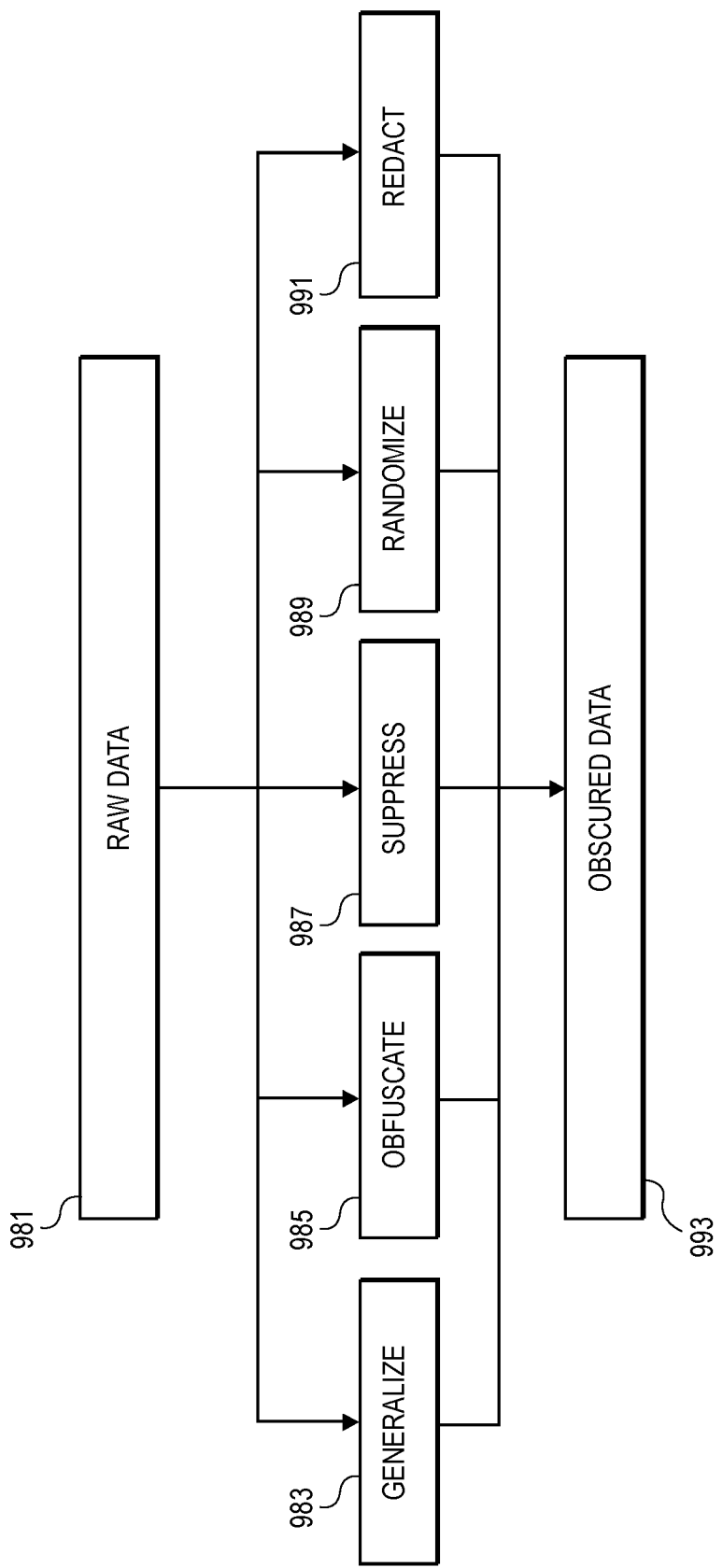
FIG. 9 is block diagram showing an example of obscuration techniques, in accordance with aspects of the present disclosure.

FIG. 9 shows an example of several obscurations, which may be, or be included in, a policy 217. The obscurations shown in this non-limiting example include five different processes, algorithms, or techniques that can be performed on a dataset: generalize 983, obfuscate 985, suppress 987, randomize 989, and redact 991. In various embodiments of the system 100, an admin user 135 can create, select, and/or modify a policy 217 to include one or more of the obscuration techniques 983-991. As shown in FIG. 9, the system 115 may apply one or more of the obscuration techniques 983-991 to the raw data 981, e.g., the data in the data source 125 and/or the virtualized database 123, and produce obscured data 993. The obscured data 993 may be provided to a query user 105 in response to a query 117, and/or the obscured data 993 may be used by the system 115 to calculate the amount of information loss caused by a policy 217 that includes one or more of the obscuration techniques 983-991.

In various implementations, generalize 983 can be a process which reduces the precision of any datum. The implementations can take several forms, including but not limited to rounding off numeric attributes to arbitrary precision, bucketing numeric values into predefined buckets, bucketing date and/or time data to predefined buckets, or generalizing categorical data into less discriminating value. An example of rounding would be rounding a dollar value such as $37,450.45 to the nearest thousand ($37,000.00). An example of bucketing may be converting age values into predefined buckets for the age brackets of 00-14, 14-18, 18-65, and 65 and over. In this example scheme, an individual of age 35 would be simply bucketed into the 18-65 bucket, providing increased anonymity on their true age. Bucketing date or time data could take the form of representing the date, Apr. 1, 2019 as simply a month-year bucket (April 2019), a year bucket (2019), or some other defined date or time precision. Generalizing categorical attributes can take the form of rolling up some category into a category which is a superset of the existing value. An example would be representing the city, Ottumwa, Iowa as either the county (Wapello County, Iowa), the state (Iowa), or the country (United States).

In various implementations, obfuscate 985 can be a process for replacing attributes from a data source 125 with some obscured value. The implementations could involve tokenization, hashing, encrypting, or otherwise replacing the sensitive data. For example the value or attribute "Emma Smith" could be represented using a unique hash of the string, such as "1c272047233576d77a9b9a1acfdf741c." This obscures the original value (Emma Smith), while retaining a 1:1 mapping with the original value. As a result the obscured data still retains information content. Other implementations of obfuscation mechanisms include obscuring the surname, and exposing only "Emma," tokenizing using a reversible process with a code book or dictionary, and encrypting the data.

In various implementations, suppress 987 can include removing or replacing the value of an attribute from the data. For example, replacing all names with a placeholder such as "Jane Doe" or an empty string. This process severely reduces the information content of an attribute in a dataset 125.

In various implementations, randomize 989 can replace an attribute at random according to some non-zero probability. This type of obscuring technique will provide plausible uncertainty regarding the value of the attribute in any single record, while preserving some of the information content of the underlying data. Randomization mechanisms can include a randomized response, local differential privacy, or other stochastic perturbative process.

In various implementations, redact 991 can be the conditional removal of a record or set of records from the dataset. This assures that certain records are not included in specific analyses or query results, in accordance with the right to be forgotten, residency requirements, or usage restrictions.

As noted previously, each of the obscuration techniques 983 through 991 can be applied, e.g., via a policy 217, either independently or in conjunction to create the obscured dataset 993.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A system for measuring an impact of a data privacy policy on a dataset, the system comprising:
    a computer-readable data storage device containing program instructions; and
    a processor, operably connected to the computer-readable data storage device, that executes the program instructions to perform operations comprising:
        sampling a data source to obtain a sample of data that is statistically representative;
        determining ridge statistics for the sample of data;
        measuring a first entropy of the sample of data;
        applying the data privacy policy to the sample of data;
        measuring a second entropy of the sample of data with the policy applied;
        calculating an information loss value based on the difference between the first entropy and the second entropy; and
        presenting the information loss value.

2. The system of claim 1, wherein the operations further comprise:
    applying the data privacy policy to the data source if the information loss value is within predetermined limits.

3. A system for measuring information loss, the system comprising:
    a computer-readable data storage device containing program instructions; and
    a processor, operably connected to the computer-readable data storage device, that executes the program instructions to perform operations comprising:
        sampling a data source to obtain a sample of data that is statistically representative;
        determining ridge statistics for the sample of data;
        receiving a data privacy policy for a dataset of the data source;
        determining an estimate of information loss caused by the data privacy policy using the ridge statistics;
        displaying the estimate of the information loss; and
        applying the data privacy policy to the data source if the estimate of the information loss is within predetermined limits.

* * * * *